United States Patent
Millward et al.

[11] Patent Number: 6,048,428
[45] Date of Patent: Apr. 11, 2000

[54] PIPE CONSTRUCTION

[75] Inventors: William A. Millward; John Dabinett, both of Worcester, United Kingdom

[73] Assignee: Royal Ordnance plc, Euxton Chorley, United Kingdom

[21] Appl. No.: 08/442,109

[22] Filed: May 16, 1995

Related U.S. Application Data

[62] Division of application No. 08/284,451, filed as application No. PCT/GB93/02483, Dec. 2, 1993, Pat. No. 5,579,809.

[30]  Foreign Application Priority Data

Dec. 8, 1992 [GB] United Kingdom ............ 9225658
Feb. 18, 1993 [GB] United Kingdom ............ 9303282

[51] Int. Cl.[7] ................................................ B65H 81/00
[52] U.S. Cl. ................ 156/190; 156/194; 138/174; 138/129; 138/144; 29/469.5; 492/52
[58] Field of Search ................ 29/469.5, 419.1, 29/895.211, 458, 895.3, 895.32; 492/52, 35; 156/184, 172, 190, 194; 138/129, 130, 133, 144, 172, 174

[56]  References Cited

U.S. PATENT DOCUMENTS

| | | |
|---|---|---|
| 1,361,001 | 12/1920 | Blaisdell . |
| 2,573,361 | 10/1951 | Rodgers, Jr. et al. . |
| 3,407,251 | 10/1968 | Elliott et al. . |
| 3,578,029 | 5/1971 | Cullen . |
| 3,616,123 | 10/1971 | Reynolds, Jr. . |
| 3,784,441 | 1/1974 | Kaempen . |
| 3,817,288 | 6/1974 | Ball . |
| 3,859,701 | 1/1975 | Huber . |
| 3,915,776 | 10/1975 | Kaempen . |
| 3,957,416 | 5/1976 | Kaempen . |
| 4,351,364 | 9/1982 | Cocks . |
| 4,848,135 | 7/1989 | Kuno . |
| 5,188,273 | 2/1993 | Schmoock . |

*Primary Examiner*—S. Thomas Hughes
*Assistant Examiner*—Marc W. Butler
*Attorney, Agent, or Firm*—Nixon & Vanderhye P.C.

[57]  ABSTRACT

A pipe and method of manufacture of the pipe are described. The pipe comprises a core of helically wound steel strip embedded in a plastics material matrix and lined with inner and outer linings of filament wound fiber reinforced plastics material.

16 Claims, 3 Drawing Sheets

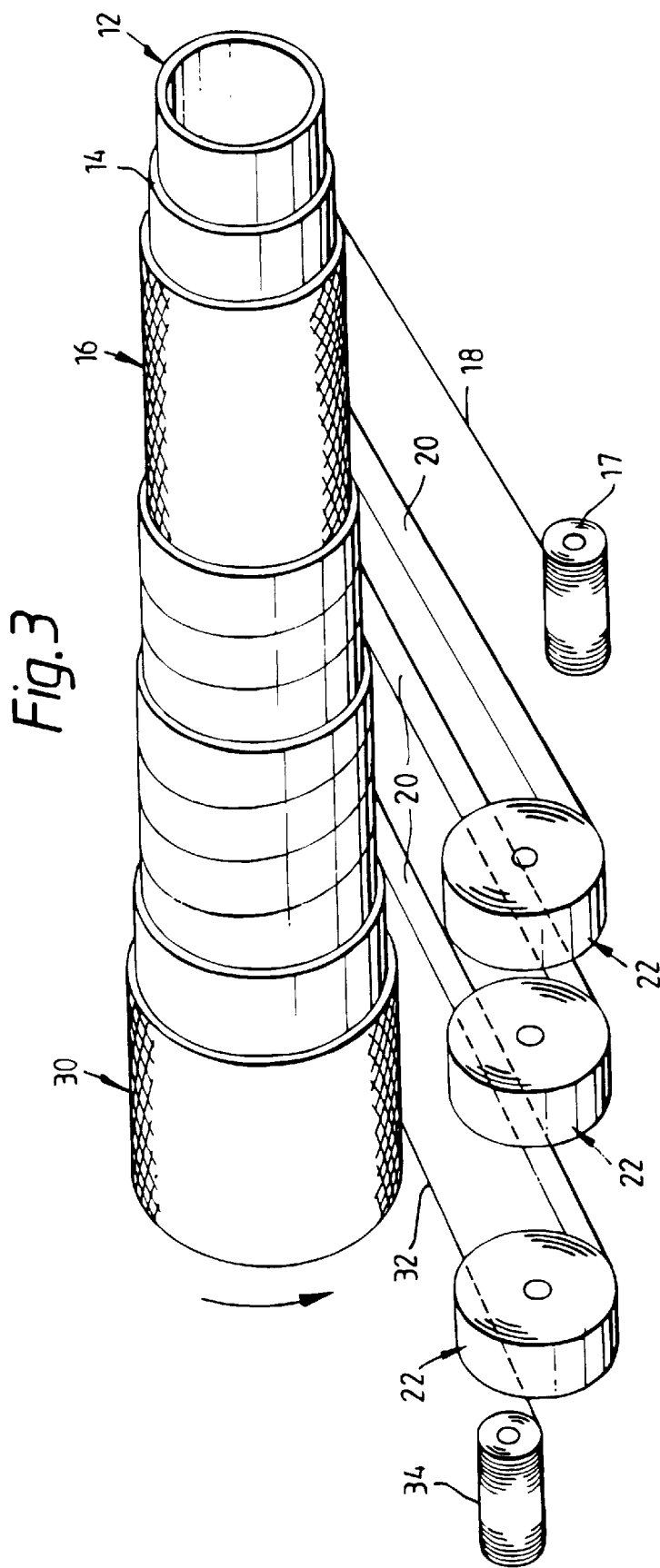

PIPE CONSTRUCTION

This is a divisional of application Ser. No. 08/284,451, filed Aug. 17, 1994 now U.S. Pat. No. 5,579,809 which is a 371 of PCT/GB93/02483 filed Dec. 2, 1993.

BACKGROUND OF THE INVENTION

1. Field of the Invention

The present invention relates to a composite construction of pipe for use in the oil, gas, water and chemical industries.

2. Description of Prior Art

It is known to manufacture pipe by the helical winding of a plurality of metal strips and which strips are embedded in a plastics material matrix.

U.S. Pat. No. 4,657,049 describes the manufacture of such pipe by helically winding at least one metallic reinforcing strip onto a mandrel, the strip being coated with and embedded within a polymeric bonding material. The tube is thus formed of a plurality of successive helical convolutions of metal strip, completely embedded in the polymeric material. In this construction the polymeric material provides only a limited degree of corrosion resistance and hence is not suitable for many pipe applications.

U.S. Pat. No. 4,351,364 describes a similar method of tube construction, but the tube also has inner and outer linings of resin impregnated glass-fibre layers. The glass-fibre layers comprise woven cloth and chopped fibre strand mat. The purpose of the inner lining is to provide corrosion resistance and a low flow resistance, whilst the purpose of the outer lining is to provide resistance to environmental conditions. Whilst the glass-fibre reinforced linings on the inside and outside of the pipe enhance the resistance to corrosion, abrasion and other environmental conditions, they do not significantly improve the strength of the pipe, nor do they provide optimum corrosion resistance owing to the porosity which is inevitably retained within the glass fibre mat and cloth.

SUMMARY OF THE INVENTION

It is an object of the present invention to provide a pipe having a construction which endows it not only with corrosion and abrasion resistance, but also with enhanced strength and stiffness. It is a further object to provide a pipe construction which when used in high pressure applications will produce a leak failure mode at elevated pressures close to ultimate burst pressure.

According to a first aspect of the present invention there is provided a pipe having inner and outer linings of fibre reinforced plastics material, the inner and outer linings having therebetween a core of helically wound steel strip, the steel strip being embedded in a plastics material matrix wherein the inner and outer linings are filament windings.

The filament windings may be mono-filaments or may be wound from multi-filament tows.

The filament windings may be laid at an angle of − and −55° relative to the pipe axis, with an error margin of + or −5°. A winding angle of + and −55° is chosen where it is desired to achieve optimum balance of hoop and axial loads, such as in the case where a cylindrical pipe has to withstand full pressure and loads. The precise angle is chosen so as to suit the operating requirements of the pipe.

Alternative layers or groups of layers of filament windings may be laid at different positive and negative angles with respect to the pipe axis and to each other.

It has been found that the use of filament wound fibre-reinforced inner and outer linings not only further enhances the resistance to corrosion, abrasion and environmental attack, but also imparts additional strength and stiffness to the complete pipe. The degree of additional strength and stiffness may be determined by calculation, but will depend upon the fundamental lining and strip material properties, the ratio of lining to total steel thickness and the helical angle of lining windings to the pipe axis. Because of the additional strength imparted by the filament wound linings, it has been found that the number of steel layers may be reduced to produce a pipe of a given strength, thus making the pipe more economic to produce and lighter in construction. Furthermore, the use of filament winding is capable of producing a higher integrity, lower porosity resin matrix than corresponding prior art constructions. Prior art tube constructions employing glass-fibre reinforced plastics (GRP) are unsuitable for high pressure applications due to micro-cracking and porosity as a result of the difficulty in fully impregnating woven and chopped strand type fibre reinforcements. The pipe of the present invention overcomes these problems because of the substantially improved impregnation level of the filament wound linings. The reduced porosity in the lining of the pipe of the present invention has the advantage of significantly reducing the possibility of corrosive attack of the embedded steel strip.

The use of filament wound linings also allows the pipe of the present invention to be used in high pressure applications. The porosity in the prior art constructions lead to local strains under pressure giving rise to local cracking, even at relatively low pressures, causing eventual leakage and failure.

At operating pressures, the filament wound linings are subjected only to low strain levels due to the presence of the relatively higher modulus strip layers. The pipe pressure containment capability may be maximised by ensuring that the strain capability of the linings is such that they fail at a predetermined pressure only after the steel layers have been loaded to a significant proportion of their ultimate strain, preferably greater than their yield strain. An effective means for determining the strain capability of the linings is by appropriate selection of the winding angle of the filaments. A significant advantage of the present invention is that the strain capability of the pipe construction may be controlled so as to give a leak failure mode at a predetermined pressure before ultimate pressure bursting occurs.

In this connection we have found that the contribution of the inner and outer filament wound linings to the ultimate pressure containment capacity of the pipe becomes significant at pressures above which yielding of the steel strip has taken place. It is advantageous therefore for the pipe construction to be so designed that leakage of the liners under internal pressures occurs at a hoop strain level at which the steel strip is in a yielded condition though not liable to ultimate failure.

This is illustrated in FIG. 1 of the accompanying drawings, which shows a graph comparing typical internal pressure versus hoop strain characteristics for (a) a pipe construction in accordance with the present invention comprising a helically wound steel core with internal and external filament wound fibre reinforced plastics linings; (b) the core without the linings; and (c) the linings without the core.

It will be seen from FIG. 1 that by ensuring that the lining strain failure occurs at around 1% ie. beyond the yield point of the steel core (0.5% strain) but at a strain less than the ultimate steel failure strain, (3%) a leak before burst failure mode is ensured, and at an elevated pressure, approaching, but always below, the ultimate burst pressure of the pipe.

For applications with fluids with which the plastics lining material is incompatible, the pipe of the present invention may also be provided with an impermeable lining such as aluminium, thermosetting plastics material or silicone rubber, for example, on which the inner filament wound lining is formed. The addition of an impermeable lining or membrane may alter the leak failure mode unless the strain to failure characteristics of the membrane are carefully matched to those of the pipe construction.

The material of the filament windings may be glass-fibre for most applications. However, other continuous fibre materials such as aramid fibre, eg Kevlar (Trade Mark), or carbon fibre may be used in combination with or instead of glass-fibre. The type of fibre used will depend upon the application in which the pipe is to be employed. In some applications, more than one type of fibre may be employed in a single pipe.

The thickness of the inner and outer linings will vary depending upon the specific requirements for the pipe. However, in the case of glass filaments, the inner lining will generally be of a minimum thickness of 2 mm whilst the outer lining will generally be of a minimum thickness of 1 mm.

The steel strip core may be formed of a plurality of layers of helically wound strips which abut along their edges. Alternatively, the steel core may be wound from one or more steel strips wherein each succeeding turn overlaps the previous turn in the axial and radial directions.

Ideally, in the case of strips which abut along their edges at any given section through the pipe wall, the winding pattern of the helically disposed steel strips is so arranged that no axial gap between adjacent edges of the wound strip in any layer coincides in the radial direction with the axial gap of any other layer. Therefore, there is no right line path with respect to the tube axis from the inside to the outside of the tube which passes through more than one of the axial helical gaps. In this way, there is no position in the pipe at which the effective steel thickness is reduced by more than one strip thickness of steel. For large numbers of steel strip layers, the winding pattern may be repeated so that in fact there may be coincidence of the axial gaps of two or more layers with only modest reduction in axial strength.

For small helical gaps the local reduction in steel thickness only affects the tube axial strength such that for pipes having three or more layers of steel, the overall pressure vessel strength is substantially unaffected. By minimising the axial gap, within manufacturing limitations, the hoop strength under internal pressurisation is unaffected, and as stated above, the axial strength is only reduced to the extent of one steel strip thickness for each coincident axial gap. Therefore the steel core of a tube having eight layers of steel has a hoop strength equivalent to the full eight layers and an axial strength equivalent to seven layers. When applied to the loading conditions of a closed vessel internally pressurised, it may be seen that as hoop loading is twice axial loading, the effective reduction in thickness in the axial direction does not detract at all from the ultimate pressure strength of the pipe. In terms of stiffness, the effect of the axial gap between the steel strip adjacent edges is the same in both the hoop and axial directions. Therefore, the steel strip layers can quite accurately be considered as an isotropic material in which the effective modulus of elasticity is simply reduced by an amount approximately equal to the ratio of the width of the resin gap to that of the steel strip. Of course, for pipes constructed in accordance with the present invention, there will be a significant additional contribution to both the axial and hoop strength of the pipe from the filament wound inner and outer linings.

Pipes of any diameter may be produced, but typically they will lie in the range from about 150 mm to about 1000 mm. The maximum strip thickness and width is determined by the mechanical requirements for winding, ie required pipe diameter to strip stiffness and helical winding angle. The strip width is also partially governed by the need to maintain an overlap pattern such that there is minimum coincidence of axial strip edge gaps from the inside to the outside of the pipe, and such that the axial interlaminar shear loads do not cause failure. In practice, for pipes having diameters between 150 mm and 1000 mm, the steel strip may have a width lying in the range from 50 mm to 250 mm, and a thickness lying in the range from 0.12 mm to 1 mm.

The axial gap between adjacent strip edges of successive helical turns will preferably be no more than 5 mm, and may generally lie in the range from 1 mm to 3 mm.

The steel is prepared prior to winding to provide a suitably clean surface for bonding with the resin. Suitable preparation techniques include grit blasting and/or various known methods of chemical cleaning.

The resin may be an epoxy resin or any type suitable for the intended application of the pipe.

The resin may also include fillers.

According to a second aspect of the present invention there is provided a method of making a pipe, the method comprising the steps of forming an inner lining by filament winding of a fibre material onto a mandrel at a predetermined angle with respect to the pipe axis, providing a resin matrix for the fibre layer, helically winding a steel strip core onto said fibre material layer, providing said steel strip core with a resin matrix, forming an outer lining by filament winding of a fibre material onto the outside of the pipe at a predetermined angle with respect to the pipe axis, providing said outer layer of fibre material with a resin matrix, at least partially curing said resin matrix and removing said pipe from said mandrel.

Preferably, the steel strip core may have at least three layers of helically wound steel strip.

The inner and outer linings may be formed by passing glass or other filaments through a resin bath prior to winding onto the mandrel or outside of the tube which may be rotated by suitable drive means.

The method may further include the step of providing an initial non-filament wound, fibrous layer on the mandrel which is also provided with a resin matrix.

In order that the present invention understood may be more fully an example will now be described by way of illustration only with reference to the accompanying drawings, of which:

FIG. 3 which shows a schematic representation of the manufacture of the tube of FIG. 2.

DETAILED DISCUSSION OF PREFERRED EMBODIMENTS

Figure 1:
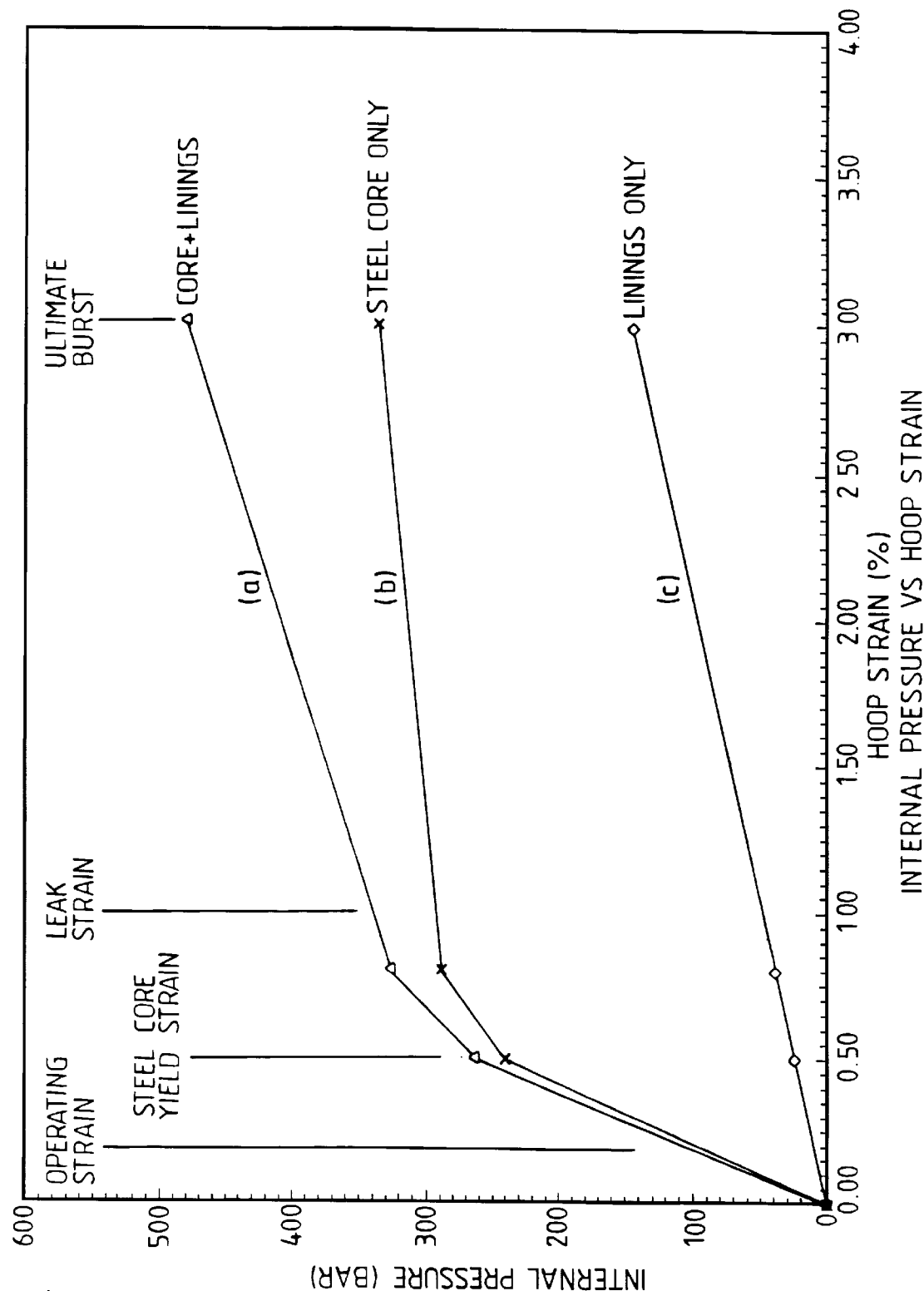
FIG. 1 shows a graph comparing internal pressure versus hoop strain characteristics for various pipe constructions.
Figure 2:
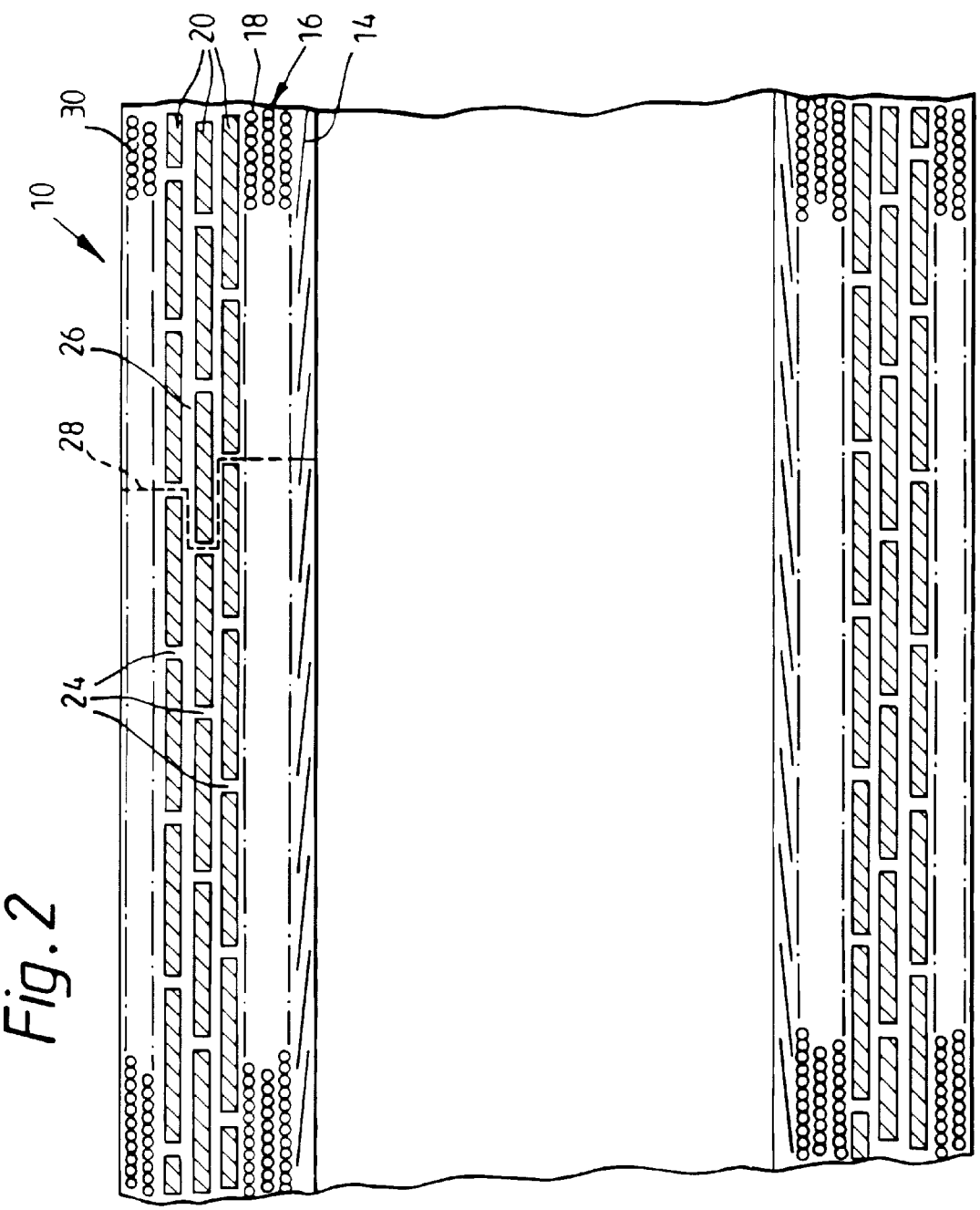
FIG. 2 shows a schematic axial cross section through a tube according to the present invention.

Referring now to FIGS. 2 and 3 of the drawings where the same features have common reference numerals. A length of pipe indicated generally at 10 is produced by winding a plurality of layers onto a heated rotating mandrel 12. The mandrel is coated with a known release agent (not shown).

A resin rich inner surface 14 is provided by helically wrapping a "C" glass or polyester veil onto the mandrel and impregnating with a suitable epoxy resin such as MY 750 supplied by the Ciba-Geigy company with a suitable hardener system. Successive helical turns of the veil material are overlapped in the axial direction, the width of the veil material being about 150 mm.

A thickness of GRP inner lining 16 is then built up by helically applying filament windings from a creel 17 of "E" glass fibre filaments 18 laid at 55° to the tube axis. The filaments 18 are passed through a resin bath (not shown) immediately prior to winding so that the windings are effectively provided with a resin matrix as they are being wound. A number of filament rovings are laid such that the minimum thickness is about 2 mm.

Prepared steel strip 20 from coils 22 is then helically wound onto the still uncured wet resin of the inner lining 16, successive helical turns lying adjacent each other with a maximum axial gap 24 of 5 mm . An epoxy resin 26 containing an appropriate filler, is simultaneously applied by known means to the steel strip as it is wound onto the pipe such that in the finished pipe, each layer of steel is coated with and bonded to the next layer by the resin system. The number steel layers and the total thickness is determined by the required pressure, stiffness rating and diameter of the pipe and the combined mechanical properties of the steel and linings. The helical windings of the steel strips are axially offset to each other so that there is no right line path from the inside to the outside of the tube through more than one of the axial gaps 26, and as indicated by the dashed line 28.

An outer lining 30 is applied by a number of rovings of 55° helical windings of an "E" glass fibre filament 32 from a creel 34. As with the inner lining, the filament 32 is passed through a resin bath (not shown) immediately prior to winding. The thickness of the outer lining 30 is a minimum of 1 mm.

Whilst still rotating, heat is applied to the thus constructed pipe to raise the temperature for the minimum time which will satisfactorily solidify or cause the resin to gel. The mandrel with gelled or cured pipe assembly is removed from the winding machine (not shown) and allowed to cool to ambient temperature whereupon the mandrel is removed from the pipe. The pipe may then be post-cured in a free standing position if required. After cooling to ambient temperature, the pipe is cut to finished length by grinding through the total wall thickness, ie GRP and steel, to remove a minimum of two pitch lengths of steel from each end.

Although the method described above involves heating of the mandrel 12 during the winding process, this may be unnecessary with certain types of resin materials, particularly those having a short curing time.

What is claimed is:

1. A method of making a composite pipe having inner and outer linings of fiber reinforced plastics material, the inner and outer linings having therebetween a core of at least one layer of helically wound steel strip, said steel strip being embedded within a resin material matrix; wherein the method comprises the steps of:
    providing a rotatable mandrel on which to form said composite pipe;
    forming said inner lining by helically winding a plurality of layers of continuous filament fiber material onto said mandrel, the continuous filament fiber comprising each of said layers being wound at a predetermined angle to an axis of said pipe and all running in a helical direction,
    providing a resin material matrix for said plurality of layers of continuous filament fiber material forming said inner lining;
    helically winding at least one layer of steel strip onto said inner lining to form said core and providing said core with a resin material matrix;
    forming the outer lining by helically winding a plurality of layers of continuous filament fiber material onto said core, the continuous filament fibers comprising each of said layers being wound at a predetermined angle to said pipe axis and all running in a helical direction;
    providing a resin material matrix for said plurality of layers of continuous filament fiber material forming said outer lining;
    at least partially curing said resin matrix; and,
    removing said composite pipe from said mandrel.

2. A method according to claim 1 wherein said steel core comprises at least three layers of helically wound steel strip embedded in a resin material matrix in said core.

3. A method according to claim 2 wherein a resin material is applied to said at least three layers of said steel strip simultaneously with winding of said steel to form said resin material matrix of said core.

4. A method according to claim 2 wherein said at least three layers of said steel strip are wound such that there is a maximum gap of 5 mm in an axial direction between each successive turn of said helically wound steel strip in each of said at least three layers.

5. A method according to claim 4 wherein said at least three layers of steel strip are wound such that said gaps between each said helical turn in each layer are displaced from each other in an axial direction of said pipe.

6. A method according to claim 1 wherein said resin material matrices for the inner and outer linings are provided by passing said continuous fiber material through a bath of said resin material prior to winding.

7. A method according to claim 1 wherein a resin material is applied to said steel strip simultaneously with winding of said steel to form said resin material matrix of said core.

8. A method according to claim 1 wherein said predetermined angle of said continuous fiber material is 55°, with a plus or minus 5° error margin.

9. A method according to claim 8 wherein alternate layers of continuous filament fiber material of said inner and outer linings are wound at positive and negative predetermined angles to said pipe axis.

10. A method according to claim 8 wherein alternate groups of layers of continuous filament fiber material of said inner and outer linings are wound at positive and negative predetermined angles to said pipe axis.

11. A method according to claim 1 further including the step of selecting the material of said continuous fibers from at least one of the group comprising glass, aramid and carbon.

12. A method according to claim 1 wherein said steel strip is wound such that there is a maximum gap of 5 mm in an axial direction between each successive turn of said helically wound steel strip.

13. A method according to claim 1 wherein alternate layers of continuous filament fiber material of said inner and outer linings are wound at positive and negative predetermined angles to said pipe axis.

14. A method according to claim 1 wherein alternate groups of layers of continuous filament fiber material of said inner and outer linings are wound at positive and negative predetermined angles to said pipe axis.

15. A method according to claim 1 wherein said continuous filament fiber material is provided as monofilament material.

16. A method according to claim 1 wherein said continuous filament fiber material is provided as tows of multifilaments.

* * * * *